(12) United States Patent
Zhang et al.

(10) Patent No.: US 12,471,879 B2
(45) Date of Patent: Nov. 18, 2025

(54) METHODS AND SYSTEMS FOR OBTAINING A 3D VECTOR FLOW FIELD

(71) Applicant: KONINKLIJKE PHILIPS N.V., Eindhoven (NL)

(72) Inventors: Bo Zhang, Paris (FR); Odile Bonnefous, Rueil-Malmaison (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 102 days.

(21) Appl. No.: 17/917,029

(22) PCT Filed: Apr. 1, 2021

(86) PCT No.: PCT/EP2021/058709
§ 371 (c)(1),
(2) Date: Oct. 5, 2022

(87) PCT Pub. No.: WO2021/204695
PCT Pub. Date: Oct. 14, 2021

(65) Prior Publication Data
US 2023/0148989 A1    May 18, 2023

(30) Foreign Application Priority Data

Apr. 7, 2020  (EP) ..................... 20290035

(51) Int. Cl.
*A61B 8/06* (2006.01)
*A61B 8/00* (2006.01)

(52) U.S. Cl.
CPC ................ *A61B 8/06* (2013.01); *A61B 8/488* (2013.01)

(58) Field of Classification Search
None
See application file for complete search history.

(56) References Cited

U.S. PATENT DOCUMENTS 5,997,479 A    12/1999 Savord et al.
6,013,032 A    1/2000 Savord
(Continued)

FOREIGN PATENT DOCUMENTS

CN    109919916 A    6/2019
EP    3586758 A1    1/2020
(Continued)

OTHER PUBLICATIONS

Gomez, A., Pushparajah, K., Simpson, J. M., Giese, D., Schaeffter, T., & Penney, G. (2013). A sensitivity analysis on 3D velocity reconstruction from multiple registered echo Doppler views. Medical image analysis, 17(6), 616-631. (Year: 2013).*

(Continued)

*Primary Examiner* — Christopher Koharski
*Assistant Examiner* — Renee C Langhals (57) ABSTRACT

The invention provides a method for obtaining a 3D vector flow field from color Doppler ultrasound data. The method includes obtaining color Doppler ultrasound data from a plurality of acquisition locations, wherein the plurality of acquisition locations comprises a target acquisition location and one or more additional acquisition locations, wherein the one or more additional acquisition locations is adjacent the target acquisition location. A 3D vector flow field is then derived from the obtained color Doppler ultrasound data.

15 Claims, 4 Drawing Sheets

(56) References Cited

U.S. PATENT DOCUMENTS

| | | | |
|---|---|---|---|
| 6,283,919 | B1 | 9/2001 | Roundhill et al. |
| 6,443,896 | B1 | 9/2002 | Detmer |
| 6,458,083 | B1 | 10/2002 | Jago et al. |
| 6,530,885 | B1 | 3/2003 | Entrekin et al. |
| 6,623,432 | B2 | 9/2003 | Powers et al. |
| 11,090,026 | B2 | 8/2021 | Hamilton et al. |
| 2008/0242996 | A1 | 10/2008 | Hallanne et al. |
| 2009/0306513 | A1 | 12/2009 | Srinivasan et al. |
| 2012/0078106 | A1* | 3/2012 | Dentinger ............ A61B 8/5223 600/454 |
| 2015/0289837 | A1* | 10/2015 | Kim ....................... A61B 8/488 600/454 |
| 2015/0342569 | A1 | 12/2015 | Zhai et al. |
| 2015/0366531 | A1 | 12/2015 | Ahn et al. |
| 2016/0302742 | A1* | 10/2016 | Maidment ................ A61B 6/54 |
| 2021/0369245 | A1 | 12/2021 | Zhang et al. |

FOREIGN PATENT DOCUMENTS

| | | |
|---|---|---|
| JP | 2017051424 A | 3/2017 |
| WO | 2018177986 A1 | 10/2018 |

OTHER PUBLICATIONS

Wigen, M. S., Fadnes, S., Rodriguez-Molares, A., Bjåstad, T., Eriksen, M., Stensæth, K. H., . . . & Lovstakken, L. (2018). 4-D intracardiac ultrasound vector flow imaging-feasibility and comparison to phase-contrast MRI. IEEE transactions on medical imaging, 37(12), 2619-2629. (Year: 2018).*

International Search Report and Written Opinion for PCT/EP2021/058709; Mailing date: Jun. 30, 2021, 9 pages.

Garcia, D. et al., "Two-dimensional Intraventricular Flow Mapping by Digital Processing Conventional Color-Doppler Echocardiography Images", IEEE Transactions on Medical Imaging, 2010, vol. 29, No. 10, pp. 1701-1713.

Osmanski, B-F. et al., "Ultrafast doppler imaging of blood flow dynamics in the myocardium", IEEE Transactions on Medical Imaging, 2012, vol. 31, No. 8, pp. 1661-1668.

Wigen, M. et al., "4-D Intracardiac Ultrasound Vector Flow Imaging-Feasibility and Comparison to Phase-Contrast MRI," IEEE Transactions on Medical Imaging, 2018, vol. 37, No. 12, pp. 2619-2629.

* cited by examiner

METHODS AND SYSTEMS FOR OBTAINING A 3D VECTOR FLOW FIELD

CROSS-REFERENCE TO PRIOR APPLICATIONS

This application is the U.S. National Phase application under 35 U.S.C. § 371 of International Application No. PCT/EP2021/058709, filed on Apr. 1, 2021, which claims the benefit of European Patent Application No. 20290035.3, filed on Apr. 7, 2020. These applications are hereby incorporated by reference herein.

FIELD OF THE INVENTION

The invention relates to the field of ultrasound imaging, and more specifically to the field of ultrasound flow measurement.

BACKGROUND OF THE INVENTION

Color Doppler imaging allows a user to visualize flow information along the ultrasound beam. This functionality has become widely deployed in echography systems.

The color Doppler data provides rough flow orientation information, which is either towards the probe along the beam orientation or away from the probe along the beam orientation. However, flow information outside of the beam orientation is typically lost. Therefore, several attempts have been made to derive full vector flow information from color Doppler data.

One approach that has been proposed is to resort to an ultrafast scanning scheme, such as the approach described in Osmanski, B.-F., M. Pernot, G. Montaldo, A. Bel, E. Messas, and M. Tanter, "Ultrafast Doppler imaging of blood flow dynamics in the myocardium," *IEEE Transactions on Medical Imaging* 31, no. 8 (2012): 1661-1668, which makes use of plane or divergent emission waves. This approach requires redesigning an ultrafast acquisition sequence and redesigning an ultrasound system front-end to make it suitable for ultrafast use.

Another approach consists of estimating flow from existing Doppler measures based on a physical model, such as the methods described in Garcia et al., "Two-dimensional intraventricular flow mapping by digital processing conventional color-Doppler echocardiography images," IEEE Trans. Med. Imag., vol. 29, no. 10, pp. 1701-1713, October 2010. The model-based approach proposed in the above document reconstructs a 2D flow field for a 2D color Doppler frame. However, in this method, the flow information in the third dimension is missing. Accordingly, in order to reconstruct a 3D flow field, a full volume acquisition would be required; however, the requirement to have a full 3D volume results in a reduced framerate.

There is therefore a need for a means of deriving full 3D flow information from limited input data.

SUMMARY OF THE INVENTION

The invention is defined by the claims.

According to examples in accordance with an aspect of the invention, there is provided a method for obtaining a 3D vector flow field from color Doppler ultrasound data, the method comprising:
obtaining color Doppler ultrasound data from a plurality of acquisition locations, wherein the plurality of acquisition locations comprises:
a target acquisition location; and
one or more additional acquisition locations, wherein the one or more additional acquisition locations are adjacent the target acquisition location; and
deriving a 3D vector flow field from the obtained color Doppler ultrasound data.

The method provides for a means of deriving 3D vector flow information from standard color Doppler ultrasound data acquisitions.

By considering the color Doppler data acquired from multiple adjacent acquisition locations, it is possible to derive fully detailed 3D vector flow information without requiring a fully realized 3D ultrasound acquisition.

In an embodiment, deriving the 3D vector flow field comprises:
obtaining a flow divergence equation;
solving the flow divergence equation to match the obtained color Doppler ultrasound data; and
deriving a 3D flow vector field based on the solved flow divergence equation.

In this way, the 3D vector flow field may be derived from an equation containing known physical restrictions that is solved to match the acquired data, thereby obtaining accurate 3D vector flow information that matches the acquired data.

In a further embodiment, the flow divergence equation comprises a divergence, and wherein the divergence is zero.

In this way, the physical restraint of the incompressibility of a fluid may be utilized to accurately model the behavior of blood within the equation.

In an embodiment, the plurality of acquisition locations comprises a first additional acquisition location and a second additional acquisition location, wherein the first additional acquisition location and the second additional acquisition location are adjacent the target acquisition location such that the target acquisition location is positioned between the first additional acquisition location and the second additional acquisition location.

In this way, additional information may be used to obtain the 3D vector flow field, thereby increasing the accuracy of the final 3D flow information.

In a further embodiment, the first additional acquisition location and the second additional acquisition location are located adjacent the target acquisition location in the elevation direction.

In an embodiment, deriving the 3D vector flow field is performed using a running window across the plurality of acquisition locations.

In this way, it is possible to obtain a 3D vector flow field without requiring color Doppler data to be acquired from the entire field of view of a probe.

In an embodiment, the plurality of acquisition locations comprises more than three acquisition locations, and wherein the running window includes the target acquisition location and two additional acquisition locations.

In an embodiment, the derived 3D vector flow field is iteratively refined using an output of the running window.

In this way, the 3D vector flow field may be refined as the data acquisition continues to occur.

In an embodiment, the plurality of acquisition locations comprise:
3D acquisition sub-volumes; and/or
2D acquisition planes; and/or
1D scan lines.

In this way, any color Doppler data, including 3D, 2D and 1D Doppler data, may be used to obtain a 3D vector flow field.

In a further embodiment, the plurality of acquisition locations comprise 1D scan lines, and wherein the plurality of acquisition locations further comprises one or more additional acquisition locations positioned adjacent the target acquisition location in the azimuth direction.

In this way, the accuracy of the 3D vector flow field derived from 1D scan line acquisitions may be improved.

According to examples in accordance with an aspect of the invention, there is provided a computer program comprising computer program code means which is adapted, when said computer program is run on a computer, to implement the methods described above.

According to examples in accordance with an aspect of the invention, there is provided a system for obtaining a 3D vector flow field from color Doppler ultrasound data, the system comprising a processor adapted to:
  obtain color Doppler ultrasound data from a plurality of acquisition locations, wherein the plurality of acquisition locations comprises:
    a target acquisition location; and
    one or more additional acquisition locations, wherein the one or more additional acquisition locations are adjacent the target acquisition location; and
  derive a 3D vector flow field from the obtained color Doppler ultrasound data.

In an embodiment, the system further comprises an ultrasound probe adapted to obtain the color Doppler data.

In an embodiment, the processor is further adapted to generate a visual representation of the 3D vector flow field, and wherein the system further comprises a display unit adapted to display the visual representation.

In an embodiment, the visual representation is displayed in combination with a visualization of the target acquisition location.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for obtaining a 3D vector flow field from color Doppler ultrasound data. The method includes obtaining color Doppler ultrasound data from a plurality of acquisition locations, wherein the plurality of acquisition locations comprises a target acquisition location and one or more additional acquisition locations, wherein the one or more additional acquisition locations is adjacent the target acquisition location. A 3D vector flow field is then derived from the obtained color Doppler ultrasound data.

Figure 1:
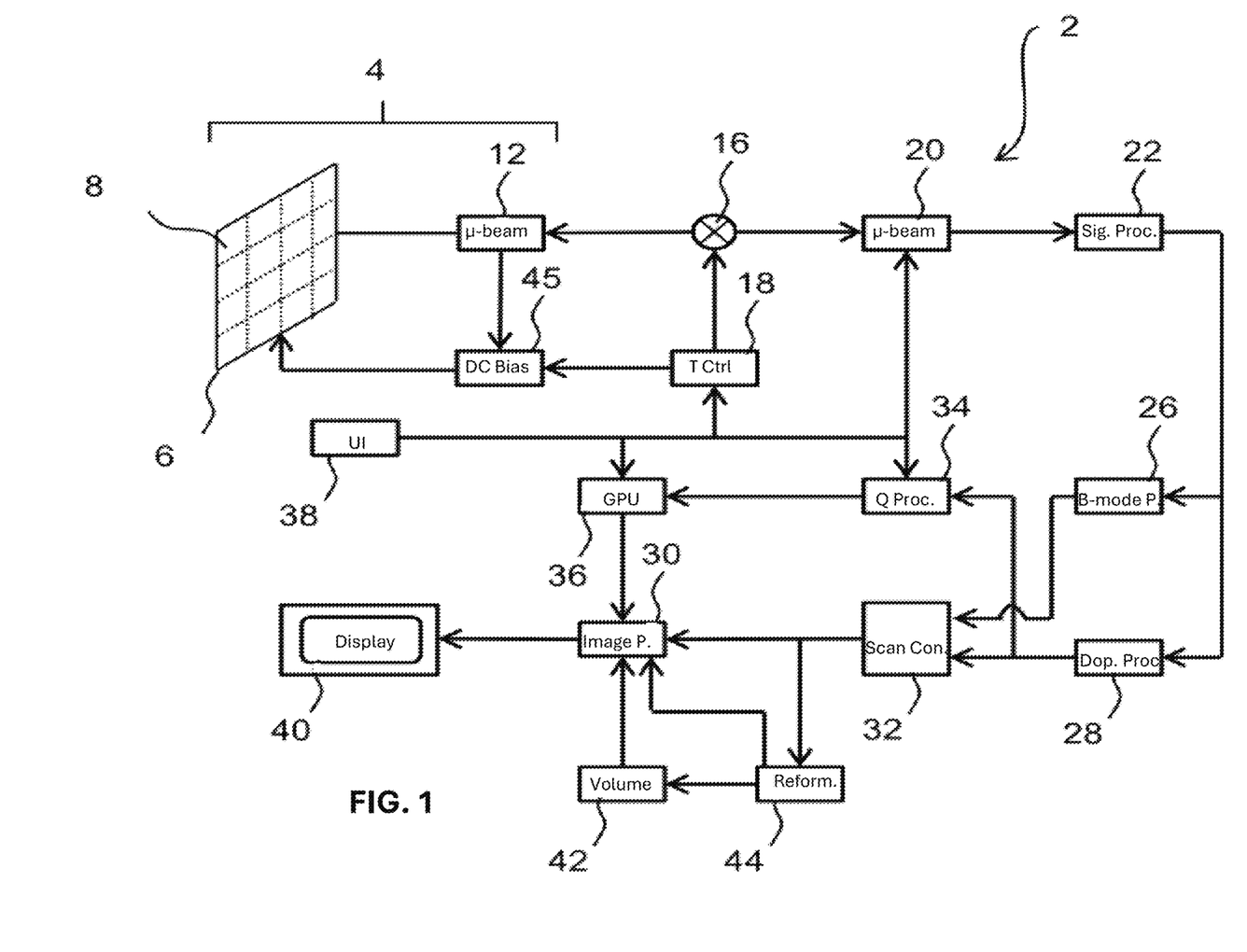
FIG. 1 shows an ultrasound diagnostic imaging system to explain the general operation.

The general operation of an exemplary ultrasound system will first be described, with reference to FIG. 1, and with emphasis on the signal processing function of the system since this invention relates to the processing of the signals measured by the transducer array.

The system comprises an array transducer probe 4 which has a transducer array 6 for transmitting ultrasound waves and receiving echo information. The transducer array 6 may comprise CMUT transducers; piezoelectric transducers, formed of materials such as PZT or PVDF; or any other suitable transducer technology. In this example, the transducer array 6 is a two-dimensional array of transducers 8 capable of scanning either a 2D plane or a three dimensional volume of a region of interest. In another example, the transducer array may be a 1D array.

The transducer array 6 is coupled to a microbeamformer 12 which controls reception of signals by the transducer elements. Microbeamformers are capable of at least partial beamforming of the signals received by sub-arrays, generally referred to as "groups" or "patches", of transducers as described in U.S. Pat. Nos. 5,997,479 (Savord et al.), 6,013,032 (Savord), and 6,623,432 (Powers et al.).

It should be noted that the microbeamformer is entirely optional. Further, the system includes a transmit/receive (T/R) switch 16, which the microbeamformer 12 can be coupled to and which switches the array between transmission and reception modes, and protects the main beamformer 20 from high energy transmit signals in the case where a microbeamformer is not used and the transducer array is operated directly by the main system beamformer. The transmission of ultrasound beams from the transducer array 6 is directed by a transducer controller 18 coupled to the microbeamformer by the T/R switch 16 and a main transmission beamformer (not shown), which can receive input from the user's operation of the user interface or control panel 38. The controller 18 can include transmission circuitry arranged to drive the transducer elements of the array 6 (either directly or via a microbeamformer) during the transmission mode.

In a typical line-by-line imaging sequence, the beamforming system within the probe may operate as follows. During transmission, the beamformer (which may be the microbeamformer or the main system beamformer depending upon the implementation) activates the transducer array, or a sub-aperture of the transducer array. The sub-aperture may be a one dimensional line of transducers or a two dimensional patch of transducers within the larger array. In transmit mode, the focusing and steering of the ultrasound beam generated by the array, or a sub-aperture of the array, are controlled as described below.

Upon receiving the backscattered echo signals from the subject, the received signals undergo receive beamforming (as described below), in order to align the received signals, and, in the case where a sub-aperture is being used, the sub-aperture is then shifted, for example by one transducer element. The shifted sub-aperture is then activated and the process repeated until all of the transducer elements of the transducer array have been activated.

For each line (or sub-aperture), the total received signal, used to form an associated line of the final ultrasound image, will be a sum of the voltage signals measured by the transducer elements of the given sub-aperture during the receive period. The resulting line signals, following the beamforming process below, are typically referred to as radio frequency (RF) data. Each line signal (RF data set) generated by the various sub-apertures then undergoes additional processing to generate the lines of the final ultrasound image. The change in amplitude of the line signal with time will contribute to the change in brightness of the ultrasound image with depth, wherein a high amplitude peak will correspond to a bright pixel (or collection of pixels) in the final image. A peak appearing near the beginning of the line signal will represent an echo from a shallow structure, whereas peaks appearing progressively later in the line signal will represent echoes from structures at increasing depths within the subject.

One of the functions controlled by the transducer controller 18 is the direction in which beams are steered and focused. Beams may be steered straight ahead from (orthogonal to) the transducer array, or at different angles for a wider field of view. The steering and focusing of the transmit beam may be controlled as a function of transducer element actuation time.

Two methods can be distinguished in general ultrasound data acquisition: plane wave imaging and "beam steered" imaging. The two methods are distinguished by a presence of the beamforming in the transmission ("beam steered" imaging) and/or reception modes (plane wave imaging and "beam steered" imaging).

Looking first to the focusing function, by activating all of the transducer elements at the same time, the transducer array generates a plane wave that diverges as it travels through the subject. In this case, the beam of ultrasonic waves remains unfocused. By introducing a position dependent time delay to the activation of the transducers, it is possible to cause the wave front of the beam to converge at a desired point, referred to as the focal zone. The focal zone is defined as the point at which the lateral beam width is less than half the transmit beam width. In this way, the lateral resolution of the final ultrasound image is improved.

For example, if the time delay causes the transducer elements to activate in a series, beginning with the outermost elements and finishing at the central element(s) of the transducer array, a focal zone would be formed at a given distance away from the probe, in line with the central element(s). The distance of the focal zone from the probe will vary depending on the time delay between each subsequent round of transducer element activations. After the beam passes the focal zone, it will begin to diverge, forming the far field imaging region. It should be noted that for focal zones located close to the transducer array, the ultrasound beam will diverge quickly in the far field leading to beam width artifacts in the final image. Typically, the near field, located between the transducer array and the focal zone, shows little detail due to the large overlap in ultrasound beams. Thus, varying the location of the focal zone can lead to significant changes in the quality of the final image.

It should be noted that, in transmit mode, only one focus may be defined unless the ultrasound image is divided into multiple focal zones (each of which may have a different transmit focus).

In addition, upon receiving the echo signals from within the subject, it is possible to perform the inverse of the above described process in order to perform receive focusing. In other words, the incoming signals may be received by the transducer elements and subject to an electronic time delay before being passed into the system for signal processing. The simplest example of this is referred to as delay-and-sum beamforming. It is possible to dynamically adjust the receive focusing of the transducer array as a function of time.

Looking now to the function of beam steering, through the correct application of time delays to the transducer elements it is possible to impart a desired angle on the ultrasound beam as it leaves the transducer array. For example, by activating a transducer on a first side of the transducer array followed by the remaining transducers in a sequence ending at the opposite side of the array, the wave front of the beam will be angled toward the second side. The size of the steering angle relative to the normal of the transducer array is dependent on the size of the time delay between subsequent transducer element activations.

Further, it is possible to focus a steered beam, wherein the total time delay applied to each transducer element is a sum of both the focusing and steering time delays. In this case, the transducer array is referred to as a phased array.

In case of the CMUT transducers, which require a DC bias voltage for their activation, the transducer controller 18 can be coupled to control a DC bias control 45 for the transducer array. The DC bias control 45 sets DC bias voltage(s) that are applied to the CMUT transducer elements.

For each transducer element of the transducer array, analog ultrasound signals, typically referred to as channel data, enter the system by way of the reception channel. In the reception channel, partially beamformed signals are produced from the channel data by the microbeamformer 12 and are then passed to a main receive beamformer 20 where the partially beamformed signals from individual patches of transducers are combined into a fully beamformed signal, referred to as radio frequency (RF) data. The beamforming performed at each stage may be carried out as described above, or may include additional functions. For example, the main beamformer 20 may have 128 channels, each of which receives a partially beamformed signal from a patch of dozens or hundreds of transducer elements. In this way, the signals received by thousands of transducers of a transducer array can contribute efficiently to a single beamformed signal.

The beamformed reception signals are coupled to a signal processor 22. The signal processor 22 can process the received echo signals in various ways, such as: band-pass filtering; decimation; I and Q component separation; and harmonic signal separation, which acts to separate linear and nonlinear signals so as to enable the identification of nonlinear (higher harmonics of the fundamental frequency) echo signals returned from tissue and micro-bubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting noise at higher frequencies from greater depths that is typically devoid of anatomical information.

The beamformers for transmission and for reception are implemented in different hardware and can have different functions. Of course, the receiver beamformer is designed to take into account the characteristics of the transmission beamformer. In FIG. 1 only the receiver beamformers 12, 20 are shown, for simplicity. In the complete system, there will also be a transmission chain with a transmission micro beamformer, and a main transmission beamformer.

The function of the micro beamformer 12 is to provide an initial combination of signals in order to decrease the number of analog signal paths. This is typically performed in the analog domain.

The final beamforming is done in the main beamformer 20 and is typically after digitization.

The transmission and reception channels use the same transducer array 6 which has a fixed frequency band. However, the bandwidth that the transmission pulses occupy can vary depending on the transmission beamforming used. The reception channel can capture the whole transducer bandwidth (which is the classic approach) or, by using bandpass processing, it can extract only the bandwidth that contains the desired information (e.g. the harmonics of the main harmonic).

The RF signals may then be coupled to a B mode (i.e. brightness mode, or 2D imaging mode) processor 26 and a Doppler processor 28. The B mode processor 26 performs amplitude detection on the received ultrasound signal for the imaging of structures in the body, such as organ tissue and blood vessels. In the case of line-by-line imaging, each line (beam) is represented by an associated RF signal, the amplitude of which is used to generate a brightness value to be assigned to a pixel in the B mode image. The exact location of the pixel within the image is determined by the location of the associated amplitude measurement along the RF signal and the line (beam) number of the RF signal. B mode images of such structures may be formed in the harmonic or fundamental image mode, or a combination of both as described in U.S. Pat. No. 6,283,919 (Roundhill et al.) and U.S. Pat. No. 6,458,083 (Jago et al.) The Doppler processor 28 processes temporally distinct signals arising from tissue movement and blood flow for the detection of moving substances, such as the flow of blood cells in the image field. The Doppler processor 28 typically includes a wall filter with parameters set to pass or reject echoes returned from selected types of materials in the body.

The structural and motion signals produced by the B mode and Doppler processors are coupled to a scan converter 32 and a multi-planar reformatter 44. The scan converter 32 arranges the echo signals in the spatial relationship from which they were received in a desired image format. In other words, the scan converter acts to convert the RF data from a cylindrical coordinate system to a Cartesian coordinate system appropriate for displaying an ultrasound image on an image display 40. In the case of B mode imaging, the brightness of pixel at a given coordinate is proportional to the amplitude of the RF signal received from that location. For instance, the scan converter may arrange the echo signal into a two dimensional (2D) sector-shaped format, or a pyramidal three dimensional (3D) image. The scan converter can overlay a B mode structural image with colors corresponding to motion at points in the image field, where the Doppler-estimated velocities to produce a given color. The combined B mode structural image and color Doppler image depicts the motion of tissue and blood flow within the structural image field. The multi-planar reformatter will convert echoes that are received from points in a common plane in a volumetric region of the body into an ultrasound image of that plane, as described in U.S. Pat. No. 6,443,896 (Detmer). A volume renderer 42 converts the echo signals of a 3D data set into a projected 3D image as viewed from a given reference point as described in U.S. Pat. No. 6,530,885 (Entrekin et al.).

The 2D or 3D images are coupled from the scan converter 32, multi-planar reformatter 44, and volume renderer 42 to an image processor 30 for further enhancement, buffering and temporary storage for display on an image display 40. The imaging processor may be adapted to remove certain imaging artifacts from the final ultrasound image, such as: acoustic shadowing, for example caused by a strong attenuator or refraction; posterior enhancement, for example caused by a weak attenuator; reverberation artifacts, for example where highly reflective tissue interfaces are located in close proximity; and so on. In addition, the image processor may be adapted to handle certain speckle reduction functions, in order to improve the contrast of the final ultrasound image.

In addition to being used for imaging, the blood flow values produced by the Doppler processor 28 and tissue structure information produced by the B mode processor 26 are coupled to a quantification processor 34. The quantification processor produces measures of different flow conditions such as the volume rate of blood flow in addition to structural measurements such as the sizes of organs and gestational age. The quantification processor may receive input from the user control panel 38, such as the point in the anatomy of an image where a measurement is to be made.

Output data from the quantification processor is coupled to a graphics processor 36 for the reproduction of measurement graphics and values with the image on the display 40, and for audio output from the display device 40. The graphics processor 36 can also generate graphic overlays for display with the ultrasound images. These graphic overlays can contain standard identifying information such as patient name, date and time of the image, imaging parameters, and the like. For these purposes the graphics processor receives input from the user interface 38, such as patient name. The user interface is also coupled to the transmit controller 18 to control the generation of ultrasound signals from the transducer array 6 and hence the images produced by the transducer array and the ultrasound system. The transmit control function of the controller 18 is only one of the functions performed. The controller 18 also takes account of the mode of operation (given by the user) and the corresponding required transmitter configuration and band-pass configuration in the receiver analog to digital converter. The controller 18 can be a state machine with fixed states.

The user interface is also coupled to the multi-planar reformatter 44 for selection and control of the planes of multiple multi-planar reformatted (MPR) images which may be used to perform quantified measures in the image field of the MPR images.

Figure 2:
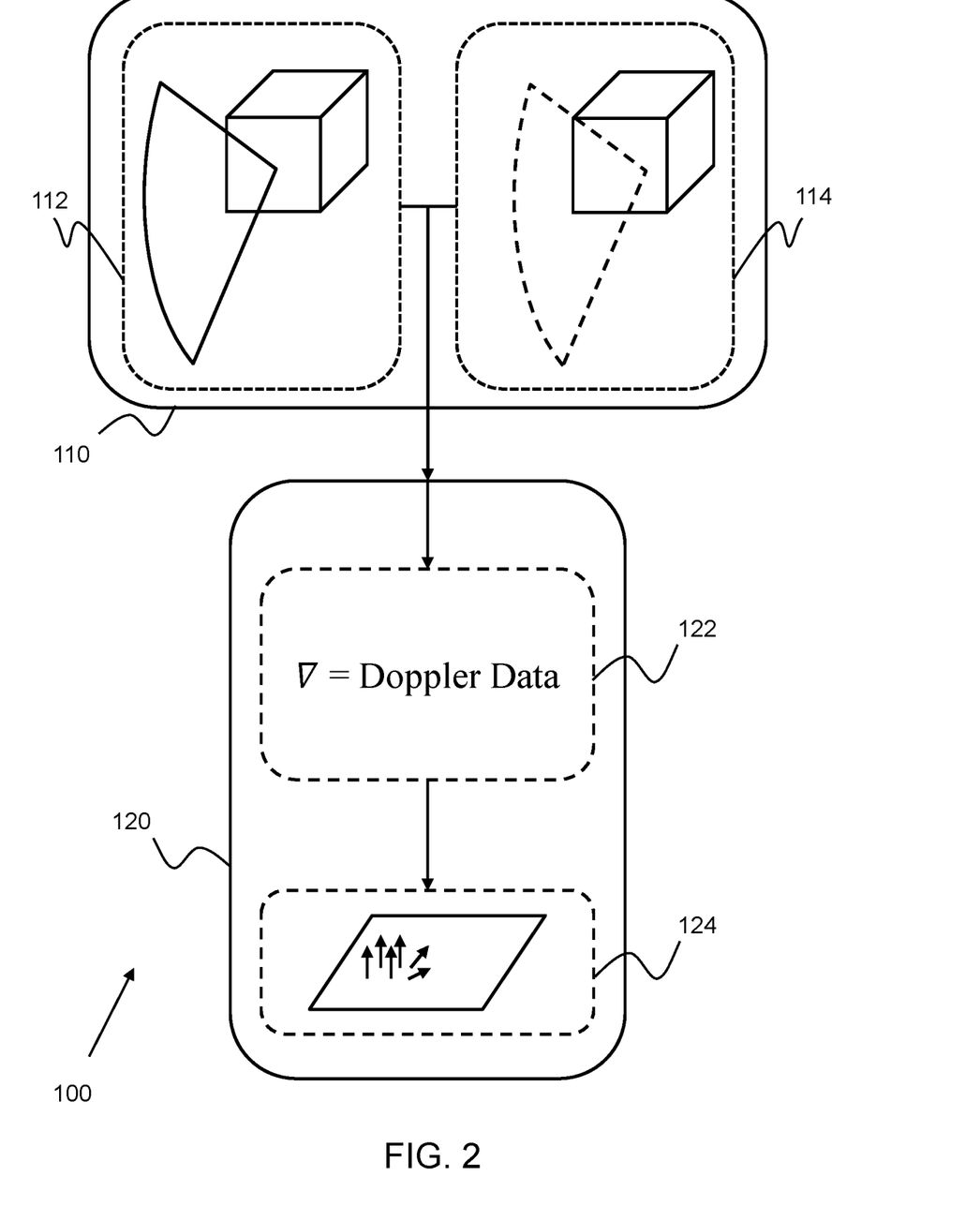
FIG. 2 shows a method of the invention.

FIG. 2 shows a method 100 for obtaining a 3D vector flow field from color Doppler ultrasound data.

The method begins in step 110 by obtaining color Doppler ultrasound data from a plurality of acquisition locations. The plurality of acquisition locations comprises a target acquisition location 112 and one or more additional acquisition locations 114, wherein the one or more additional acquisition locations are adjacent the target acquisition location.

By considering additional color Doppler information in the vicinity of the target acquisition location, the 3D vector flow field may be more accurately derived. Put another way, by using additional acquisition locations, the full 3D flow orientation may be accounted for without falsely assuming flow information based on only a single acquisition location.

In step 120, a 3D vector flow field is derived from the obtained color Doppler ultrasound data.

For example, the 3D vector flow field may be derived from the color Doppler ultrasound data by obtaining a flow divergence equation. The flow divergence equation may then be solved in step 122 to match the obtained color Doppler ultrasound data and in step 124, the 3D flow vector field may be derived based on the solved flow divergence equation.

Looking to step 122 in more detail, the flow divergence equation may be as follows:

$$\min_{u} \text{loss}\,(\langle s, u \rangle, \text{DopplerData}), \text{ where } \nabla \cdot u = 0;$$

wherein: u is the 3D flow vector field to be solved; and s is the Doppler acquisition orientation.

In the above equation, the term loss specifies a cost function that measures the similarity between predicted Doppler values with the observed color Doppler data. For example, the loss function could be a quadratic loss function. The equation seeks the minimum value of the loss function in order to maximize the similarity between the predicted Doppler values and the observed color Doppler data (DopplerData).

The divergence-free constraint ($\nabla \cdot u=0$) may be computed by a 3D divergence operator in the vicinity of the target acquisition location. Additional boundary conditions could be also be included in the divergence equation. The divergence equation may be numerically solved using gradient methods.

Put another way, the predicted Doppler values from the 3D field, u, may be matched with the observed color Doppler measurements whilst simultaneously constraining the equations to the divergence-free condition: $\nabla \cdot u=0$. The 3D divergence is available due to the acquisition of color Doppler data at the one or more additional acquisition locations in addition to the target acquisition location.

The divergence equation may be limited based on any physical parameter in order to accurately model the flow constraints in a given application. In the example above, the equation is restrained based on the assumption that the divergence in the 3D vector flow field is zero, which is based on the know incompressibility of a fluid.

The proposed method may be easily implemented within current systems capable of performing color Doppler imaging, without any need for system front-end redesign.

Figure 3A:
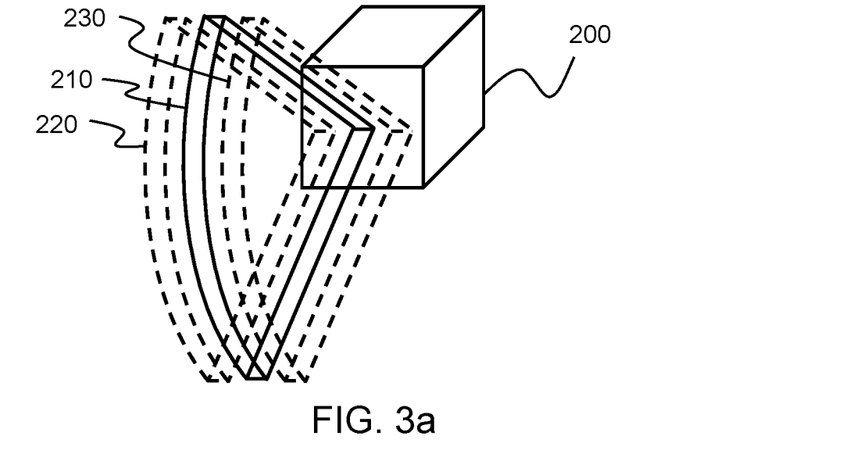
FIGS. 3a to 3c show schematic representations of exemplary acquisition schemes.
Figure 3B:
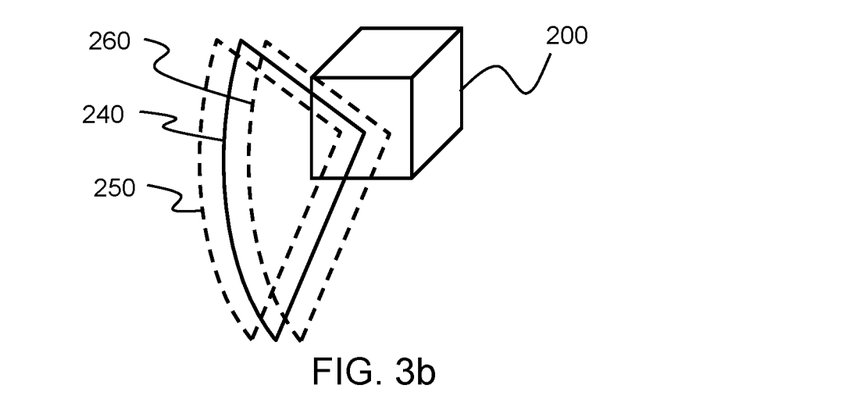
Figure 3C:
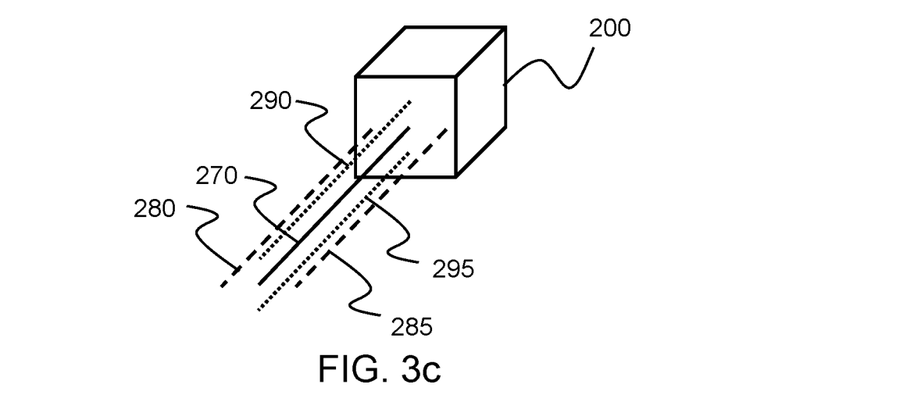

FIGS. 3a to 3c show schematic representations of exemplary acquisition schemes that may be employed in the method above.

FIG. 3a shows an example where an ultrasound probe 200 is adapted to acquire a plurality of 3D sub-volumes. In this example, the target acquisition location is a target 3D sub-volume 210 and the one or more additional acquisition locations comprises a first additional 3D sub-volume 220 and a second additional 3D sub-volume 230. In the example shown in FIG. 3a, the first and second additional 3D sub-volumes are positioned such that they are adjacent the target 3D sub-volume in the elevation direction, and wherein the target 3D sub-volume is located between the first and second additional 3D sub-volumes.

FIG. 3b shows an example where an ultrasound probe 200 is adapted to acquire a plurality of 2D acquisition planes. In this example, the target acquisition location is a target 2D plane 240 and the one or more additional acquisition locations comprises a first additional 2D plane 250 and a second additional 2D plane 260. In the example shown in FIG. 3b, the first and second additional 2D planes are positioned such that they are adjacent the target 2D plane in the elevation direction, and wherein the target 2D plane is located between the first and second additional 2D planes.

Put another way, the method described above with reference to FIG. 2 may be implemented in a 3D or a 2D color Doppler imaging scheme by additionally including color Doppler information from the vicinity of the target acquisition location. In this way, 3D flow information may be derived from 2D color Doppler data. The 3D flow information may then be displayed on the target 2D frame.

FIG. 3c shows an example where an ultrasound probe 200 is adapted to acquire a plurality of 1D scan lines. In this example, the target acquisition location is a target 1D scan line 270 and the one or more additional acquisition locations comprises a first additional 1D scan line 280 and a second additional 1D scan line 285. In the example shown in FIG. 3c, the first and second additional 1D scan lines are positioned such that they are adjacent the target 1D scan line in the elevation direction, and wherein the target 1D scan line is located between the first and second additional 1D scan lines.

Further, the example in FIG. 3c shows the case where the plurality of acquisition locations further comprises a third additional 1D scan line 290 and a fourth additional 1D scan line 295 positioned adjacent the target acquisition location in the azimuth direction, and wherein the target 1D scan line is located between the third and fourth additional 1D scan lines.

In another example, when the acquisition locations comprise a plurality of 1D scan lines, the one or more additional acquisition locations may include a single additional 1D scan line adjacent the target 1D scan line in the elevation direction and a single additional 1D scan line adjacent the target 1D scan line in the azimuth direction.

Put another way, the method described above with respect to FIG. 2 may be implemented for 1D scan lines as well as 3D sub-volumes and 2D planes. From each 1D scan line, the 3D flow information on the points along each line may be computed.

1D scan lines are typically used to acquire M-mode ultrasound data. By additionally acquiring several 1D scan lines in the vicinity of the target 1D scan line, in both azimuth and elevation directions, it is possible to derive the 3D vector flow field.

Further, the multiline flow estimation scheme used in the 1D scan line example may also be applied to 2D color Doppler and 3D color Doppler acquisitions. In these cases, the 3D vector flow field may be derived from each arrival line of the given acquisition, rather than from each plane, thereby further reducing the latency between color data acquisition and arriving at a 3D vector flow field result.

Figure 4:
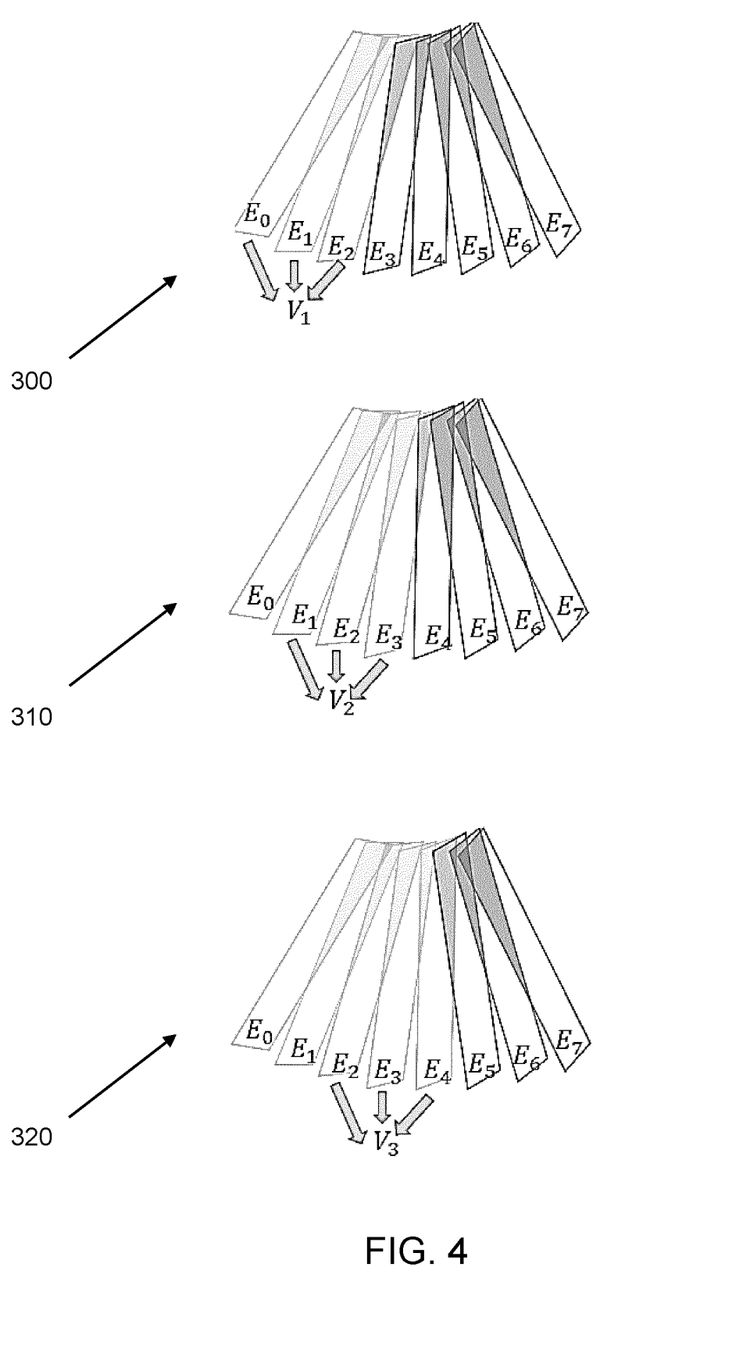
FIG. 4 shows a schematic representation of deriving a 3D vector flow field using a running window.

FIG. 4 shows a schematic representation of deriving a 3D vector flow field using a running window.

In the example described with respect to FIG. 4, a 3-frame running window is provided for deriving the 3D vector flow field based on the acquired color Doppler data. It should be noted that any number of frames for the running window may be selected based on the given application. By using an increased number of frames, the accuracy of the resulting 3D vector flow field is increased, but the time taken to calculate the 3D vector flow field is also increased. Conversely, a reduced number of frames for the running window results in a faster calculation time, but a lower accuracy. It has been found that the use of 3 frames for the running window resulted in a favorable balance between accuracy and calculation time.

The use of a running window provides for the reconstruction of a 3D vector flow field at each acquisition location, such as a 2D elevation plane, immediately after each acquisition has been performed. Put another way, by using a running window, it is not necessary to acquire the full volume of interest in order to compute the 3D vector flow field.

Looking to FIG. 4, at step 300, elevation planes in a 3D volume are denoted as $E_t$. For example, $E_0$, $E_1$ and $E_2$ are the first, second, and third elevation planes, respectively, that correspond to acquisition order over time. As the elevation planes are being acquired, as long as 3 consecutive acquisition planes are available, they may be formed into a 3-plane volume, in which a 3D vector flow field estimation is performed and the 3D vector field may be retained on the middle plane.

By way of example, at step 300, $E_0$, $E_1$ and $E_2$ are available, meaning a 3D vector flow field, $V_1$, may be calculated on $E_1$. At step 310, $E_3$ is acquired and $E_1$, $E_2$ and $E_3$ may be used to compute vector flow $V_2$ on $E_2$. At step 320, $E_4$ is acquired and $E_2$, $E_3$ and $E_4$ may be used to compute vector flow $V_3$ on $E_3$. This process may then be continued until the end of the acquisition sequence.

In this way, the 3D vector flow field is calculated upon each acquisition. In other words, the 3D vector flow field is produced at every arriving frame and there is no need to wait until the end of the full-volume acquisition before computing the 3D vector flow field.

Each 3D vector flow field calculated via the running window may be replaced by a subsequent 3D vector flow field. Alternatively, the 3D vector flow fields may be additively combined across all of the acquisition locations. Further, the 3D vector flow field may be iteratively refined based on each subsequently calculated 3D vector flow field.

The 3D vector flow field may comprise any density of vectors suitable for the given application of the methods described herein. For example, the 3D vector flow field may comprise at least one vector measurement every 2 mm, or every 1 mm. Further, any ultrasound probe capable of performing color Doppler imaging may be used to acquire the color Doppler ultrasound data used in the methods above. For example, a probe having a linear array of transducers or a phased array of transducers may be used.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for obtaining a 3D vector flow field from color Doppler ultrasound data, the method comprising:
    obtaining color Doppler ultrasound data from a plurality of acquisition locations, wherein the plurality of acquisition locations comprises more than three acquisition locations including:
       a target acquisition location; and
       two or more additional acquisition locations, wherein the two or more additional acquisition locations are adjacent the target acquisition location; and
    deriving a 3D vector flow field from the obtained color Doppler ultrasound,
    data using a running window across the plurality of acquisition locations including
    the target acquisition location and two additional acquisition locations adjacent the target acquisition location on opposite sides of the target acquisition location,
    wherein for each iteration of the running window, the target acquisition location shifts in a first direction to an acquisition location adjacent to the target acquisition location of an immediately preceding iteration of the running window.

2. The method as claimed in claim 1, wherein deriving the 3D vector flow field comprises:
    obtaining a flow divergence equation;
    solving the flow divergence equation to match the obtained color Doppler ultrasound data; and
    deriving a 3D flow vector field based on the solved flow divergence equation.

3. The method as claimed in claim 2, wherein the flow divergence equation comprises a divergence, and wherein the divergence is zero.

4. The method as claimed in claim 1, wherein the two or more additional acquisition locations are located adjacent the target acquisition location in the elevation direction.

5. The method as claimed in claim 1, wherein the derived 3D vector flow field is iteratively refined using an output of the running window.

6. The method as claimed in claim 1, wherein the plurality of acquisition locations comprise:
    3D acquisition sub-volumes; and/or
    2D acquisition planes; and/or
    1D scan lines.

7. The method as claimed in claim 6, wherein the plurality of acquisition locations comprise 1D scan lines, and wherein the plurality of acquisition locations further comprises the additional acquisition locations positioned adjacent the target acquisition location in the azimuth direction.

8. A computer program comprising computer program code means which is adapted, when said computer program is run on a computer, to implement the method of claim 1.

9. A system for obtaining a 3D vector flow field from color Doppler ultrasound data, the system comprising a processor adapted to:
    obtain color Doppler ultrasound data from a plurality of acquisition locations, wherein the plurality of acquisition locations comprises more than three acquisition locations including:
       a target acquisition location; and
       two or more additional acquisition locations, wherein the two or more additional acquisition locations are adjacent the target acquisition location; and
    derive a 3D vector flow field from the obtained color Doppler ultrasound data using a running window across the plurality of acquisition locations including the target acquisition location and two additional acquisition locations adjacent the target acquisition location on opposite sides of the target acquisition location, wherein for each iteration of the running window, the target acquisition location shifts in a first direction to an acquisition location adjacent to the target acquisition location of an immediately preceding iteration of the running window.

10. The system as claimed in claim 9, wherein the system further comprises an ultrasound probe adapted to obtain the color Doppler data.

11. The system as claimed in claim 9, wherein the processor is further adapted to generate a visual representation of the 3D vector flow field, and wherein the system further comprises a display unit adapted to display the visual representation.

12. The system as claimed in claim 11, wherein the visual representation is displayed in combination with a visualization of the target acquisition location.

13. The method system as claimed in claim 9, wherein the derived 3D vector flow field is iteratively refined using an output of the running window.

14. The method as claimed in claim 1,
wherein the two or more additional acquisition locations include a first additional acquisition location, a second additional acquisition location, and a third additional acquisition location; and
wherein the plurality of acquisition locations comprise:
3D acquisition sub-volumes; and/or
2D acquisition planes; and/or
1D scan lines.

15. The system as claimed in claim 9,
wherein the two or more additional acquisition locations include a first additional acquisition location, a second additional acquisition location, and a third additional acquisition location; and
wherein the plurality of acquisition locations comprise:
3D acquisition sub-volumes; and/or
2D acquisition planes; and/or
1D scan lines.

* * * * *